Sept. 2, 1952 E. M. BROWN 2,609,253
BEARING CONSTRUCTION
Filed Dec. 21, 1949
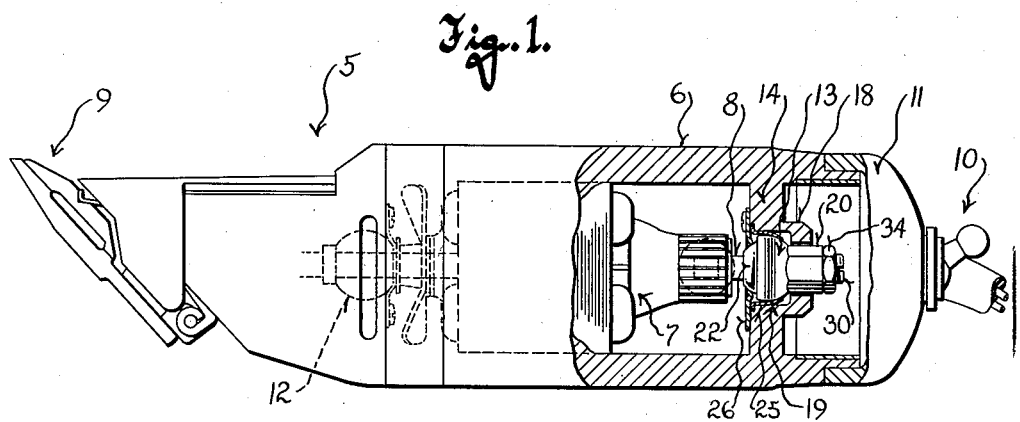
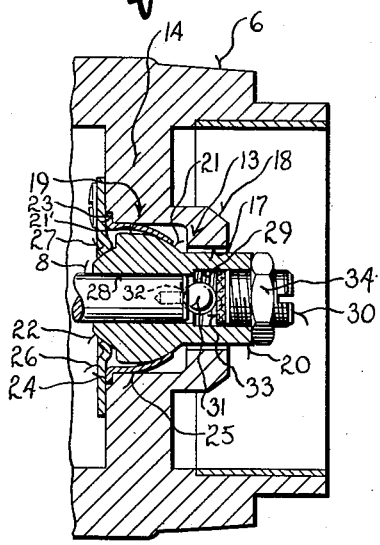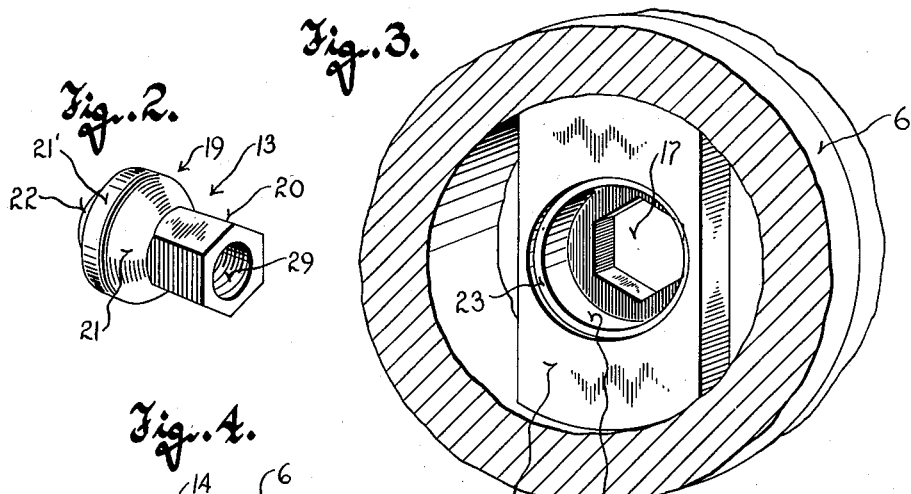
Ellis Moss Brown Patented Sept. 2, 1952

2,609,253

UNITED STATES PATENT OFFICE 2,609,253

BEARING CONSTRUCTION

Ellis Moss Brown, Racine, Wis., assignor to John Oster Manufacturing Company, Racine, Wis., a corporation of Wisconsin Application December 21, 1949, Serial No. 134,156

5 Claims. (Cl. 308—72)

This invention relates to bearings generally, and has more particular reference to a self-centering bearing construction which is particularly adapted for use with small electric motor driven tools or appliances to rotatably support the armature shaft of the motor.

In small electric motor driven tools, such as a hair clipper for instance, the motor is contained within a housing which serves as a handle for the clipper, and the armature or motor shaft is rotatably supported by bearings located in walls which extend transversely across the interior of the housing near the ends of the handle.

In such small electric motor driven tools as hair clippers and the like an annoying problem has always existed in the provision of a bearing for one end of the motor shaft which would accommodate a degree of misalignment of the shaft. This problem has been solved to a large extent by the use of self-centering bearings. Bearings of this type are generally well known, and are usually received in a socket having a spherically shaped bottom; the bearing itself being ball shaped or spherical to allow universal swivelling motion of the bearing in the socket. These bearings have a hole axially therethrough to rotatably receive and journal the shaft, and revolve or adjust themselves to a "centered" position automatically by the insertion of the shaft thereinto.

Another problem which has been particularly annoying has been to prevent self-centering bearings of the type described from rotating in their sockets with the motor shaft. This problem has been solved with varying degrees of satisfaction by keying the bearing either to the wall in which the socket is formed or to the retainer commonly employed to hold the bearing in its socket. The objection to this expedient is that it frequently and objectionably imposes restraint upon the free alignment of the bearing with the shaft and sometimes even causes the bearing to be locked against the swivelling motion essential to accommodate misalignment of the motor shaft. In addition, this practice of keying the bearing to hold it against rotation with the motor shaft involved expensive machining and/or forming operations on the bearing and its retainer and inevitably increased the cost of production.

A more serious problem encountered with the use of self-centering bearings of the type here in question developed from attempts to associate them with suitable thrust receiving means for the end of the motor shaft journalled in the bearing. While end thrust may be borne by one or more thrust washers interposed between the self-centering bearing and an enlargement such as the commutator on the motor shaft, the use of ball thrust bearings seated in a shallow cavity in the end of the motor shaft is considered more advantageous.

Despite their advantages, however, ball thrust bearings cannot be used successfully unless they are exactly coaxial with the shaft bearing. If there is any eccentricity the rotation of the motor shaft tends to drive the ball thrust bearing around in a circular path, and eventually the ball bearing wears a ring-like groove in the surface of the stop behind it, and chattering results. This is obviously objectionable.

Ball thrust bearings of the character described, unless exactly coaxial with the bearing, are also highly objectionable because they give the effect of a third support for the motor shaft and result in considerable wear and short life of the shaft bearings.

Another problem is the provision of bearings for such small electric motor driven tools as hair clippers and the like results from the lack of space in the crowded interiors of the housings for the devices. This necessitates a bearing construction which is preferably short and as compact as possible.

This invention offers a solution to the problem of precluding rotation of the self-centering bearing in its socket through the provision of a non-circular stem on one end of the bearing and coaxial with the hole therein, which stem is adapted to project through and loosely fit a similarly shaped non-circular hole in the wall in which the bearing is received, at the bottom of the socket in said wall. While this expedient prevents rotation of the bearing with the motor shaft it nevertheless does not interfere with the degree of universal swivelling motion of the bearing which is essential to achieve the desired self-aligning characteristics of the bearing.

This invention also presents a solution to the problem of end thrust of the motor shaft when using self-centering bearings of the type described. This problem is solved by the incorporation of thrust receiving means in the self-centering bearing of this invention. More specifically, the thrust receiving means comprises an adjustable thrust screw threaded into the outer end of the non-circular stem on the bearing coaxial with the shaft receiving hole in the bearing, so that the inner end of the screw may receive the thrust of the shaft. This screw, being capable of axial adjustment, also enables end play of the shaft to be controlled, and may serve to hold a ball thrust bearing against the adjacent end of the motor shaft. The screw is held in its properly adjusted position by a lock nut threaded thereover and bearing against the outer end of the non-circular stem on the bearing, and one of the features of this invention resides in the fact that the bearing is positively held against rotation, in the manner previously described, during tightening and loosening of the lock nut whenever the thrust screw needs adjustment.

This invention also presents a solution to the problem of compactness of the bearing construction described, and achieves this desirable objective by cutting down the shaft receiving end of the self-centering bearing and providing it with a spherical keeper engaging surface of considerably smaller radius than the spherical socket engaging surface on the bearing.

With the above and other objects in view which will appear as the description proceeds, this invention resides in the novel construction, combination and arrangement of parts substantially as hereinafter described, and more particularly defined by the appended claims, it being understood that such changes in the precise embodiment of the herein disclosed invention may be made as come within the scope of the claims.

The accompanying drawing illustrates one complete example of the physical embodiment of the invention constructed in accordance with the best mode so far devised for the practical application of the principles thereof, and in which:

Figure 1 is a view of a small electric motor driven hair clipper, portions of the housing of the motor being broken away and shown in section to illustrate the bearing of this invention;

Figure 2 is a perspective view of the bearing per se;

Figure 3 is an enlarged fragmentary perspective view of the housing of the clipper illustrating the formation of the transverse wall thereof in which the bearing is mounted; and Figure 4 is an enlarged longitudinal sectional view showing the bearing in place in the housing of the clipper.

Referring now more particularly to the accompanying drawing the numeral 5 designates a small electric motor driven hair clipper of the type having a hollow handle 6 which forms the housing for the motor 7 of the clipper. The motor or armature shaft 8 is drivingly connected at one end with the movable blade of a clipper assembly 9 in a conventional manner, and the motor switch 10 is mounted on a cup-like detachable end cap 11 which closes the other end of the housing.

The front end of the armature shaft projects toward the clipper assembly 9 and is journalled in a bearing 12; and the rear end of the motor shaft is rotatably journalled in the bearing 13 of this invention. Both bearings 12 and 13 are mounted on transverse walls of the housing 6, and while the forward one of said walls has not been shown the rear wall 14 in which the bearing 13 is located is in the nature of a transverse post or rib extending across the center of the housing adjacent to the rear of the motor and a distance forwardly of the switch end of the housing.

The wall 14 has a well 16 formed therein, the mouth of which opens to the front side of said wall, toward the motor 7. The wall 14 also has a non-circular hole 17 formed therein leading from the bottom of the well 16, centrally thereof, and extending entirely through a boss 18 on the opposite or rear side of said wall. As shown, the hole 17 is preferably hexagonal and considerably smaller in size than the diameter of the well 16 with which it communicates.

The bearing 13 of this invention is of the self-centering type, and for this purpose is formed with an enlarged substantially ball-shaped head, generally designated 19, of a size to fit within the well 16, and a reduced hexagonal shank or stem 20 joined to and extending rearwardly from the head coaxial therewith. The stem or shank 20 may be said to be tubular, and it preferably has a hexagonal cross section of a size to loosely fit the hexagonal hole 17 in the wall 14. The head 19 has a large diameter rearwardly facing convex or spherical surface 21 at its junction with the stem or shank. At its front end, the head portion of the bearing is cut down and provided with a smaller diameter forwardly facing spherical surface 22 nearly concentric to the surface 21 to provide a shoulder which is adapted to face the electric motor 7 when the bearing is mounted on the wall 14 with its head portion in the cylindrical well 16 and its hexagonal shank portion projecting rearwardly through the hexagonal hole 17 in the bottom of the well. Because of the fact the head is cut down at its front end, the bearing is foreshortened enough so that only the extremity of the spherical surface 22 at the front of the bearing projects from the mouth of the well 16, and, hence, the bearing is almost entirely embedded in the wall 14.

The well 16 opens to the front or motor side of the wall 14 through a shallow counterbore, coaxial with the well, and defining a forwardly facing ledge 23 at its bottom. Seated on this ledge is the flange-like rim 24 of a cup 25. The cup fits inside the well 14 and has a hole in its bottom through which the bearing stem 20 projects. The bottom inner portion of the cup is shaped to substantially conform to the large spherical surface 21 on the bearing, thus providing a socket in which the bearing may revolve or swivel universally. Such universal swivelling motion, however, is limited by the engagement between the substantially cylindrical surface 21', into which the spherical surface 21 merges, with the inner sides of the cup adjacent to the rim end thereof.

If desired, the cup may be dispensed with and the spherically bottomed socket formed directly in the wall 14 at the bottom of the well 16, in an obvious manner. In either event, it will be noted that the loose fit between the hexagonal stem 20 and the hexagonal hole in the wall 14 enables the bearing to swivel in the manner described.

As stated, the small diameter spherical surfaced front end of the head projects only slightly forwardly out of the well 16, and it is engaged by a stamped retaining clip 26 and held thereby in the bottom of the cup 25. The clip is secured flatwise to the wall 14 over the counterbore therein, and has an inwardly projecting annular flange which terminates in a forwardly directed rim 27, and this rim engages the spherical surface of the shoulder 22 and exerts a degree of pressure on the head to urge its large diameter spherical shoulder 21 into engagement with the bottom of the cup.

Because of the oppositely facing spherical surfaces 21 and 22 on the head portion 19, the retaining clip 26 cooperates with the bottom portion of the cup 16 to produce the effect of a complete ball socket for the head portion of the bearing enabling the bearing to swivel in the well to accommodate any misalignment of the motor shaft 8.

The motor shaft 8 is adapted to be rotatably received in a bore 28 leading through the head 19 of the bearing coaxially of the stem 20 thereof, and the stem is provided with a drilled and tapped hole 29 coaxial with the bore 28 of the head portion and communicating therewith as seen best in Figure 4. The tapped hole 29 in the stem is slightly larger in diameter than the bore 28 to accommodate a thrust screw 30 which is threaded into the hole 29 from the outer end of the stem as shown in Figure 4. Thus, the inner end of the screw provides a thrust receiving stop in the interior of the stem to receive the thrust of the motor shaft.

This screw is also provided to enable end play of the motor shaft 8 to be held to a desirable minimum and to enable the extent of such end play to be adjusted by turning of the screw in or out of the threaded hole 29. While the set screw 30 may have its inner end extending forwardly into direct engagement with the end of the motor shaft 8 to receive the thrust and limit the end play of the motor shaft, it is preferably spaced from the end of the motor shaft, as shown in Figure 4, and a ball bearing 31 is interposed between the end of the shaft and the inner end of the thrust screw to be maintained thereby in a shallow axial depression 32 in the end of the shaft.

If desired, a disc 33 of hard fibre, or the like, may be interposed between the ball 31 and the inner end of the thrust screw.

While it is possible that in some cases the thrust screw alone might be sufficient to maintain the end play of the armature shaft under control, a lock nut 34 is preferably threaded over the set screw and tightened against the outer end of the stem 20 of the bearing to securely lock the screw against such accidental rotation as would alter its setting.

With the structure described it will be noted that the hexagonal shank portion 20 of the bearing projects rearwardly of the transverse wall 14 and into the space at the rear of the motor housing which is closed by the detachable cap 11, so that when end play adjustment is necessary the cap may be removed to provide ready access to the lock nut 34 and the set screw 30. It will also be noted that tightening or loosening of the lock nut as well as adjustment of the thrust screw 30 is greatly facilitated by reason of the positive rotation restraining connection between the hexagonal stem 20 on the bearing and the sides of the hexagonal hole 17 in the wall 14, which connection is strong enough to withstand the great torsional forces on the bearing incidental to tightening and loosening the lock nut 34.

It should also be observed that the lock nut 34 is no greater in size than the hexagonal stem 20, and is preferably also hexagonal. This allows the bearing parts to be subassembled and mounted on the wall 14 as a unit, inserting the stem end of the bearing into the mouth of the well 16 from the front side of said wall and entirely therethrough so that the outer end of the thrust screw and the lock nut thereon are accessible for manipulation when the end cap 11 is removed.

Attention is directed to the fact that while the bearing of this invention has been described in connection with a small electric motor driven hair clipper, its use is not confined to such an instrumentality; and that the bearing is capable of being advantageously employed in any instrumentality wherever it is essential or desirable to restrain the bearing against rotation on the axis of the shaft journalled therein, and to have self-aligning characteristics while occupying a minimum of space. As stated previously, these objectives are achieved primarily because of the construction of the bearing unit per se.

From the foregoing description taken in connection with the accompanying drawing, it will be readily apparent to those skilled in the art that this invention provides an improved bearing construction which is simple and inexpensive to manufacture; which is admirably suited for use in cases where the bearing must not only rotatably journal a shaft and have self-aligning characteristics while being positively restrained against rotation with the shaft; and which incorporates an end thrust bearing therein by which end play of the shaft may be controlled.

What I claim as my invention is:

1. A self-aligning bearing of the type in which one end portion of a shaft is adapted to be rotatably journalled, said bearing comprising: a substantially ball-shaped head and a stem of polygonal cross-section extending rearwardly therefrom, said head having a hole therein coaxial with the stem to receive and rotatably journal said end portion of the shaft, the ball-shaped head having coaxial convex surfaces at its front and rear; a supporting wall having a well opening to its front in which the ball-shaped head of the bearing is received; means in said well defining a socket having a concave surface in mating engagement with the convex surface on the rear of the head to provide for universal swivelling motion of the head in the well an extent sufficient to accommodate slight angular misalignment of the shaft with respect to said wall; said wall also having a polygonal hole therethrough opening into the bottom of said well, coaxial therewith, and of a shape and size to loosely receive said polygonal stem and thereby prevent rotation of the bearing on its axis while permitting angular adjustment thereof; and an annular retaining element secured to the front of the wall coaxially with said well and engaged over the front convex surface of the head to hold the head in the well with the rear convex surface on the head in engagement with said concave surface in the well.

2. The self-aligning bearing set forth in claim 1 wherein said means defining the socket in the well includes a cup-like shell having its bottom adjacent to the bottom of the well; and an external flange on the top of said cup-like shell confined between said retaining element and the wall to thereby hold the shell in place in the well.

3. The self-aligning bearing set forth in claim 1 further characterized by the fact that the rear convex surface of said ball-shaped head of the bearing has a large diameter and the front convex surface thereof has a small diameter so that the head has an axial dimension substantially less than the diameter of the large convex surface to enable said well to be relatively shallow and to receive substantially the entire head.

4. A self-centering bearing of the character described, comprising: a substantially ball-shaped head having an axial hole therethrough to receive and rotatably journal one end portion of a shaft, said head having a substantially cylindrical equatorial portion, a large diameter convex rear end surface at one side of the equatorial portion and a small diameter convex front end surface at the other side of the equatorial portion, said convex ends being coaxial with the equatorial portion and the axial dimension of the head being substantially less than the diameter of the equatorial portion; and a reduced tubular stem of polygonal cross-section joined to and projecting coaxially from the large diameter convex rear end surface of the head.

5. In a self-aligning bearing of the type in which one end portion of a shaft is received and rotatably journalled: a retaining wall having a relatively shallow well opening to its front surface; a bearing received in said well and having an axial hole in which said end portion of the shaft is received and held substantially coaxial with the well, said bearing having a large diameter convex surface at its rear facing the bottom of the well and a smaller diameter convex surface at its front so that the axial length of the bearing is substantially less than the diameter of said large convex surface to enable the bearing to be received in the relatively shallow well; a cup-like shell in said well having its bottom adjacent to the bottom of the well and in mating engagement with the large diameter convex surface on the bearing and having an external flange at its top overlying a portion of the wall surrounding the well; an annular retaining element secured to the front of the wall coaxially with said well and overlying said flange on the shell to clamp the same against the wall and thereby retain the shell in place in the well; and cooperating interengaging means carried by the bearing and the wall to preclude rotation of the bearing in the well while permitting angular adjustment of the bearing.

ELLIS MOSS BROWN.

REFERENCES CITED

The following references are of record in the file of this patent:

UNITED STATES PATENTS

| Number | Name | Date |
|---|---|---|
| 386,788 | Roberts | July 24, 1888 |
| 633,096 | Keiper | Sept. 12, 1899 |
| 878,859 | Bok | Feb. 11, 1908 |
| 1,237,717 | Spark | Aug. 21, 1917 |
| 2,272,118 | Imse | Feb. 3, 1942 |

FOREIGN PATENTS

| Number | Country | Date |
|---|---|---|
| 9,845 | Great Britain | 1899 |